T. B. RYAN.
VALVE LOCK.
APPLICATION FILED AUG. 4, 1914.
1,243,558.
Patented Oct. 16, 1917.
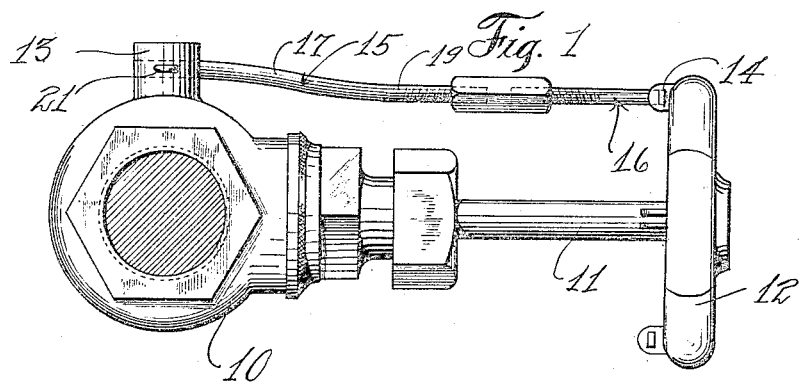
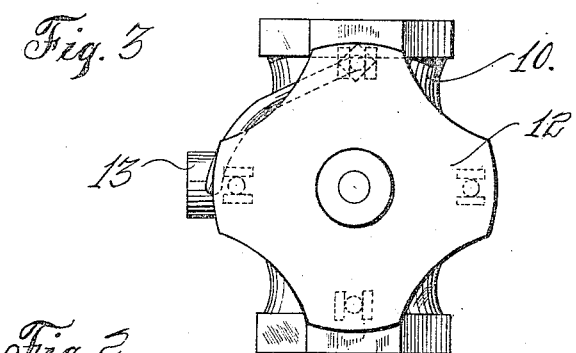
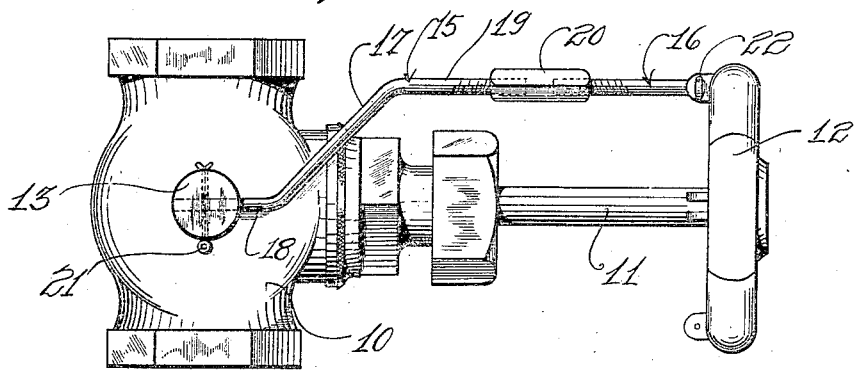
Inventor
Thomas B. Ryan,

UNITED STATES PATENT OFFICE.

THOMAS B. RYAN, OF NEW BEDFORD, MASSACHUSETTS.

VALVE-LOCK.

1,243,558.　　　　　Specification of Letters Patent.　　Patented Oct. 16, 1917.

Application filed August 4, 1914. Serial No. 854,981.

*To all whom it may concern:*

Be it known that I, THOMAS B. RYAN, a citizen of the United States, residing at New Bedford, in the county of Bristol and State of Massachusetts, have invented certain new and useful Improvements in Valve-Locks, of which the following is a specification.

This invention relates to valves, and has for its object the production of a lock for the same to prevent the flow of fluid which the valve controls from being tampered with.

Another object of this invention is to provide a valve lock that is secured to the valve casing and to the controlling wheel, thus preventing the rotation of the wheel.

A still further object of this invention is the production of a valve lock that will efficiently lock the valve in the elected of four desired positions.

A still further object of this invention is the production of a device of the kind above described that is simple in construction, efficient in operation and consists of the minimum number of parts.

With these and other objects in view, this invention consists of certain novel constructions, combinations and arrangement of parts as will be hereinafter fully described and claimed.

In the accompanying drawings:—

Figure 1 is the end view of a valve equipped with the improved lock.

Fig. 2 is a side elevation of a valve equipped with the improved lock.

Fig. 3 is a top plan view of a valve that is equipped with the improved locking means.

Referring to the parts by reference numerals, a valve casing is designated by 10, the stem by 11 and the ordinary wheel secured fast to said stem by the numeral 12. Formed integrally with the valve casing and extending at an angle to the inlet and outlet openings of the same, is a stud or projection 13 that has formed therethrough bores that are disposed at right angles to each other and are in communication also. Formed on the underface of the wheel 12 and spaced at regular intervals thereon, are four sets of spaced ears 14 that are provided with registering openings.

To efficiently lock the stem from rotation, that of course will prevent the movement of the valve upon its seat, there is means provided to connect the stud 13 and one of the pairs of ears 14 formed upon the wheel 12 that is secured fast upon the stem 11. This means consist in two rods 15 and 16, the rod 15 having an angularly disposed portion 17 and a lower stud-engaging portion 18 and an upper portion 19 having its end threaded. The rod 16 has one end of the same threaded, the threads thereon being oppositely disposed to those that are on the portion 19 of the rod 15, and a nut 20 is provided with threads that engage the respective threads on the rods 15 and 16, so as to move the ends of the rods 15 and 16 in the desired direction. It will, of course, be understood that this nut 20 is so shaped as to receive a wrench or like implement to facilitate the rotation of the same when necessary.

The portion 18 of the rod 15 is provided with an opening adjacent the end thereof, and said portion 18 is adapted to be positioned in one of the bores formed in the stud 13, and to retain the same therein a pin 21 is passed through the bore that extends at an angle to the one into which the portion 18 is positioned, said pin passing through the opening formed adjacent the end of the portion 18 and extending through the stud 13, as is clearly shown in Fig. 2. On the opposite end of the rod 16 to that on which the threads are formed, is an eye or opening formed therein. Said eye or opening is adapted to be positioned in alinement with the openings formed in one of the sets of ears 14, so as to allow means to be passed through the alined openings to retain the rod 16 between one of the sets of ears 14. As shown in the drawing, a pin 22 is passed through the alined openings formed in a set of the ears 14 and the rods 16, and if so desired, a lock having a key could be used so as to further insure the retaining of the rod 16 between one of the several sets of the ears 14.

When the device is in the position as just applied, as is clearly shown in the accompanying drawings, it will be seen that it is well nigh impossible to rotate the wheel 12 because of the fact that the same is secured from rotation by means of the rods 15 and 16. It will also be noted that the set of ears 14, to which the rod 16 is attached, is at an angle to a horizontal line passing through the center of the stud 13 to which the lower portion of the rod 15 is attached, and this makes the rotation of the handle when the device is in the position as shown all the more difficult, inasmuch as the rod 15 is bent so as to form the angularly extending portion 17, and to rotate said wheel 12 pressure would have to be against the angle which of course makes the same practically impossible to turn. By having a plurality of means formed on the wheel 12, as shown, the lock can be applied at every one-quarter turn of the wheel, thus locking the valves in almost any desired position.

It is obvious that minor changes may be made in the form and construction of this invention without departing from the material parts thereof. It is therefore not wished to confine the invention to the exact form herein shown and described, but it is wished to include all such as properly come within the scope claimed.

I claim:

In combination with a valve casing and a valve operating means associated therewith, of a lock to prevent said operating means from movement comprising a pair of rods, one of the same being detachably secured to the valve casing, the other thereof detachably secured to the operating means, and means for connecting said rods, said connecting means being adapted to move one of said rods relatively to the other when either one of the rods is disconnected from its respective casing or operating means.

In testimony whereof I affix my signature in presence of two witnesses.

THOMAS B. RYAN.

Witnesses:
JOHN E. FLAHERTY,
CHAS. E. COWING.

Copies of this patent may be obtained for five cents each, by addressing the "Commissioner of Patents, Washington, D. C."